(12) United States Patent
Ishii et al.

(10) Patent No.: US 11,381,772 B2
(45) Date of Patent: Jul. 5, 2022

(54) IMAGE PICKUP ELEMENT, ITS CONTROL METHOD, AND IMAGE PICKUP APPARATUS WITH IMPROVED FOCUS DETECTION AND PIXEL READOUT PROCESSING

(71) Applicant: CANON KABUSHIKI KAISHA, Tokyo (JP)

(72) Inventors: Mie Ishii, Tokyo (JP); Nobuhiro Takeda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/221,386

(22) Filed: Apr. 2, 2021

(65) Prior Publication Data

US 2021/0314513 A1 Oct. 7, 2021

(30) Foreign Application Priority Data

Apr. 7, 2020 (JP) .............................. JP2020-069090

(51) Int. Cl.
*H04N 5/378* (2011.01)
*H04N 5/376* (2011.01)
*H04N 5/3745* (2011.01)

(52) U.S. Cl.
CPC .......... *H04N 5/378* (2013.01); *H04N 5/3765* (2013.01); *H04N 5/37452* (2013.01); *H04N 5/37455* (2013.01)

(58) Field of Classification Search
CPC ...... H04N 5/3559; H04N 5/379; H04N 5/347; H04N 5/378; H04N 5/37452; H04N 5/37455; H04N 5/3765
See application file for complete search history.

(56) References Cited

U.S. PATENT DOCUMENTS

2013/0215290 A1* 8/2013 Solhusvik ............ H04N 5/2355
348/231.99
2016/0198109 A1* 7/2016 Ishii ................. H04N 5/232122
348/302

FOREIGN PATENT DOCUMENTS

EP 1 085 751 B1 11/2012
JP 3774597 B2 5/2006
WO 2016/136448 A1 9/2016

* cited by examiner

*Primary Examiner* — Nicholas G Giles
(74) *Attorney, Agent, or Firm* — Cowan, Liebowitz & Latman, P.C.

(57) ABSTRACT

An image pickup element has a configuration in which a pixel region substrate and a readout circuit substrate are stacked. On a pixel region substrate, a plurality of unit pixels configured by a micro lens and a plurality of photoelectric converters are arranged in the horizontal direction and the vertical direction. On a readout circuit substrate, a plurality of readout circuits that read out a signal based on charges stored in the photoelectric converter is arranged in the horizontal and vertical directions. In the unit pixels that are adjacent to each other in the horizontal direction (or the vertical direction), a first photoelectric converter of a first unit pixel and a second photoelectric converter of a second unit pixel share one readout circuit.

10 Claims, 12 Drawing Sheets

IMAGE PICKUP ELEMENT, ITS CONTROL METHOD, AND IMAGE PICKUP APPARATUS WITH IMPROVED FOCUS DETECTION AND PIXEL READOUT PROCESSING

BACKGROUND OF THE INVENTION

Field of the Invention

The present invention relates to a signal readout technique in a solid-state image pickup element in which many pixel portions each having a plurality of photoelectric converters are arranged.

Description of the Related Art

Analog-to-digital (AD) conversion method for an image signal acquired by image pickup includes a pixel-parallel AD method for performing high-speed readout. International Publication No. WO2016/136448 discloses a configuration in which AD converters are provided for each pixel. A comparator that compares a pixel signal with a slope type reference signal and, in the subsequent stage, a latch circuit that holds a digital count value to serve as a pixel signal are provided.

Japanese Patent No. 3774597 discloses an image pickup element having a function capable of detecting the focus by using a signal acquired by an image pickup element. Two photoelectric converters corresponding to one micro lens respectively receive light from different pupil plane regions of an image pickup lens. Focus detection is performed by comparing the output of the two photoelectric converters. Additionally, a normal captured image can be obtained by performing an adding calculation of the output signals of the two photoelectric converters.

A case is assumed in which a pupil division type pixel configuration is applied to an image pickup apparatus including AD converters for each pixel by combining conventional techniques. For example, a unit pixel corresponding to one micro lens includes two photoelectric converters and one AD converter serving as a shared readout circuit. In this case, in a readout mode during which focus detection is performed, when the signals from the two photoelectric converters of the unit pixel are sequentially AD-converted and read out, a difference occurs in the storing timings between the two photoelectric converters. This causes a decrease in the focus detection performance for an object, which is a moving body.

In contrast, when the unit pixel includes two photoelectric converters and two AD converters, the circuit area of the AD converter increases, and as a result, it becomes difficult to arrange the AD converters within a limited area of the unit pixel. In particular, it is typically required to arrange a dozen transistors per one bit in the latch circuit that holds the AD-converted pixel signal. For example, when a 14-bit latch circuit is newly arranged, a large circuit area is required due to the increase of about a hundred of transistors.

SUMMARY OF THE INVENTION

The present invention provides an image pickup element that can acquire a signal from which an exposure time difference has been reduced while suppressing an increase in the number of circuits that read out a signal from a pixel portion having a plurality of photoelectric converters.

An image pickup element of the embodiments of the present invention comprises a plurality of pixel portions each configured to have a plurality of photoelectric converters, and a plurality of readout circuits configured to read out a signal based on charges stored in the photoelectric converters, wherein a first photoelectric converter of a first pixel portion and a second photoelectric converter of a second pixel portion adjacent to the first pixel portion share a first readout circuit, and wherein the first readout circuit reads out a signal based on a charge stored in the second photoelectric converter, and a second readout circuit reads out a signal based on a charge stored in a third photoelectric converter of the second pixel portion.

Further features of the present invention will become apparent from the following description of exemplary artifacts with reference to the attached drawings.

BRIEF DESCRIPTION OF THE DRAWINGS

FIGS. 6A and 6B illustrate an example of the readout order of pixel signals according to the first embodiment.

FIGS. 10A and 10B illustrate examples of the readout order of the pixel signals according to the second embodiment.

DESCRIPTION OF THE EMBODIMENTS

Hereinafter, each embodiment of the present invention will be described in detail with reference to the accompanying drawings. An example of an image pickup element having a configuration in which pixel portions having a plurality of photoelectric converters are arranged in a horizontal direction and a vertical direction, and an image pickup apparatus having the image pickup element will be described.

First Embodiment

Figure 1:
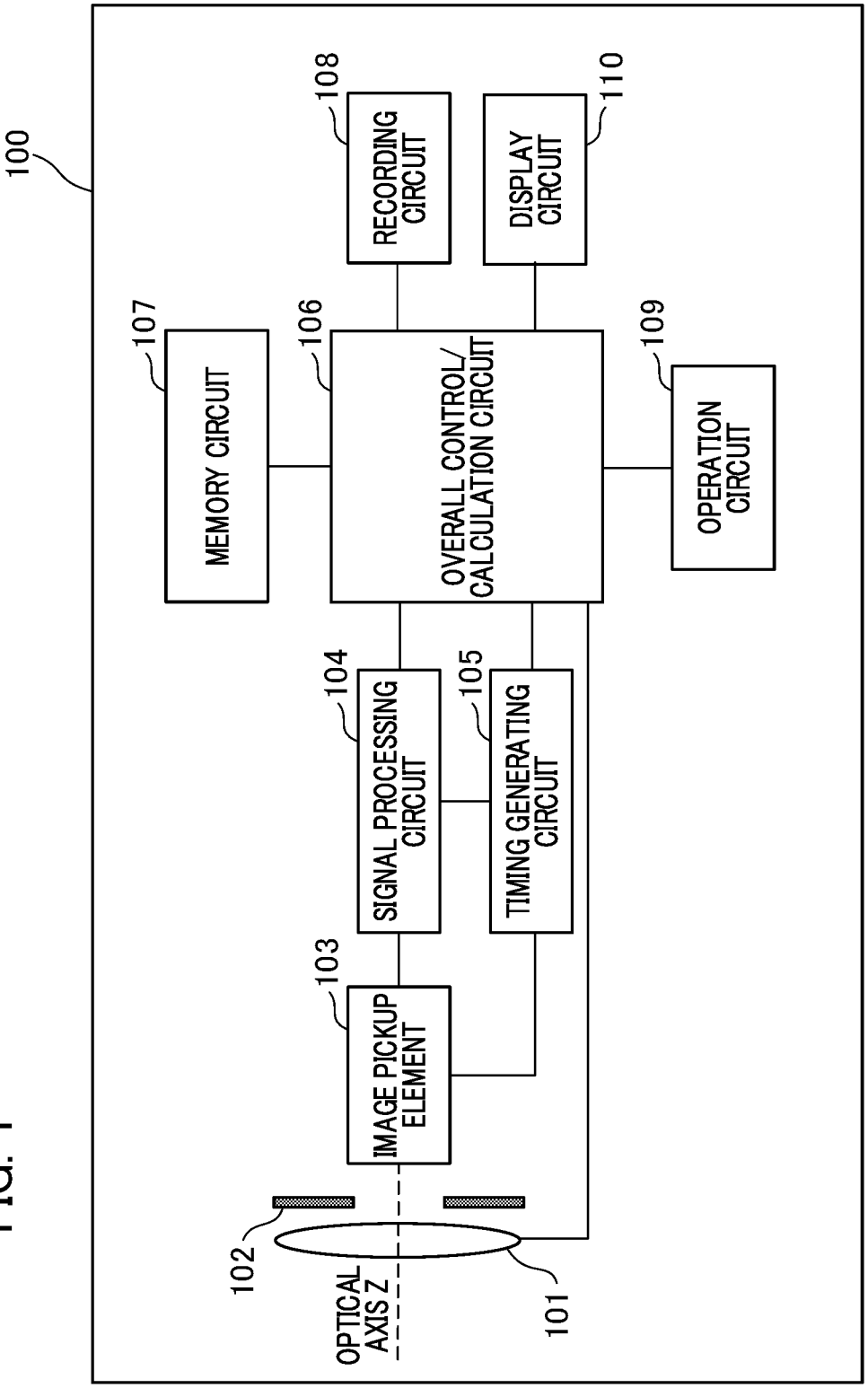
FIG. 1 is a block diagram illustrating a schematic configuration of an image pickup apparatus according to embodiments of the present invention.

FIG. 1 is a block diagram illustrating a schematic configuration of an image pickup apparatus 100 according to the present embodiment. An image pickup optical system of the image pickup apparatus 100 includes an image pickup lens 101 and a diaphragm 102. Light that has passed through the image pickup lens 101 and the diaphragm 102 on an optical axis (Z axis direction) forms an image near the focus position of the image pickup lens 101. Although the image pickup lens 101 is shown as a single lens, it is actually configured by a lens group comprising a plurality of lenses.

An image pickup element 103 performs photoelectric conversion on an object image formed by the image pickup lens 101 and receives it as a signal. A signal processing circuit 104 performs various processes such correction of signal amplification and reference level adjustment on the signal output from the image pickup element 103, and the rearrangement of data. Note that a signal processing unit may be provided in the image pickup element 103 to perform some signal processes such as reference level adjustment. A timing generating circuit 105 outputs a driving timing signal to the image pickup element 103 and the signal processing circuit 104.

An overall control/calculation circuit (hereinafter, referred to as a "control unit") 106 includes a CPU (central processing unit) and performs overall driving and control for the entire image pickup apparatus 100, including the image pickup element 103 and the signal processing circuit 104. The CPU executes various processes according to a predetermined control program.

The control unit 106 performs, for example, predetermined image processing and defect correction on the image signal that has been output from the signal processing circuit 104. A memory circuit 107 and a recording circuit 108 have a recording medium such as a non-volatile memory or a memory card that records and holds the image signals and the like that have been output from the control unit 106.

An operation circuit 109 receives a signal from an operation member and an input device provided in the image pickup apparatus 100, and outputs an operation instruction signal to the control unit 106 to reflect the instruction from a user to the control unit 106. A display circuit 110 performs a process for displaying a shot image, a live view image, and various setting screens and the like on the screen of the display unit.

Figure 2:
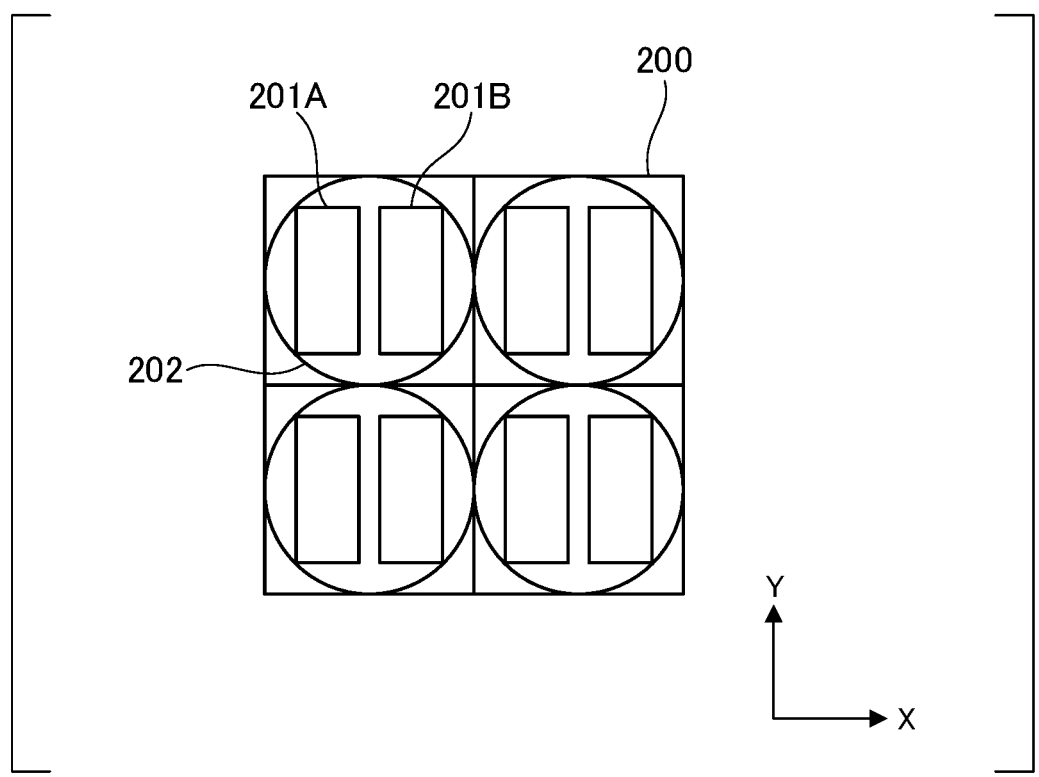
FIG. 2 is a schematic diagram illustrating a configuration example of a pixel of an image pickup element according to the embodiments of the present invention.

Next, with reference to FIG. 2 and FIG. 3, a configuration of the image pickup element 103 will be described. FIG. 2 is a schematic view of a light receiving portion and a micro lens array of the image pickup element 103 when viewed from the optical axis direction. One pixel portion corresponding to each micro lens 202 forming the micro lens array is defined as a unit pixel 200. The unit pixel 200 has a plurality of photoelectric converters 201. The photoelectric converters 201 are configured by a photodiode (hereinafter, also referred to as a "PD"). In the present embodiment, two photoelectric converters 201 are arranged in the horizontal direction (X-axis direction) at a unit pixel and are defined as a first photoelectric converter 201A and a second photoelectric converter 201B. Additionally, the vertical direction orthogonal to the X-axis direction is defined as the Y-axis direction.

According to the configuration in which two PDs corresponding to one micro lens 202 are arranged, the photoelectric converters 201A and 201B can each receive the light of exit pupil partial regions divided into two. The focus of the image pickup lens 101 can be detected by comparing the signals of the two photoelectric converters that have received the light of different exit pupil partial regions.

The pupil-divided signals of the photoelectric converter 201A are acquired from a plurality of unit pixels 200 arranged in the X-axis direction and a signal of the object image configured by these output signals groups is defined as an A-image signal. The pupil-divided signals of the photoelectric converter 201B are acquired from the unit pixels 200 arranged in the X-axis direction, and a signal of the object image configured by these output signal groups is defined as a B-image signal. The signal processing circuit 104 and the control unit 106 perform a correlation calculation on the A-image signal and the B-image signal to detect an amount of image deviation (pupil division phase difference). Additionally, the focus position corresponding to an arbitrary object position in a screen can be calculated by multiplying an amount of image deviation by a conversion coefficient determined based on the focus position of the image pickup lens 101 and the optical system. The control unit 106 performs drive control of the focus lens of the image pickup lens 101 based on the calculated focus position information. Thus, an imaging plane phase difference AF (autofocus) becomes possible. Additionally, an A+B image signal obtained by adding the A image signal and the B image signal can be used for a typical shot image signal.

Figure 3:
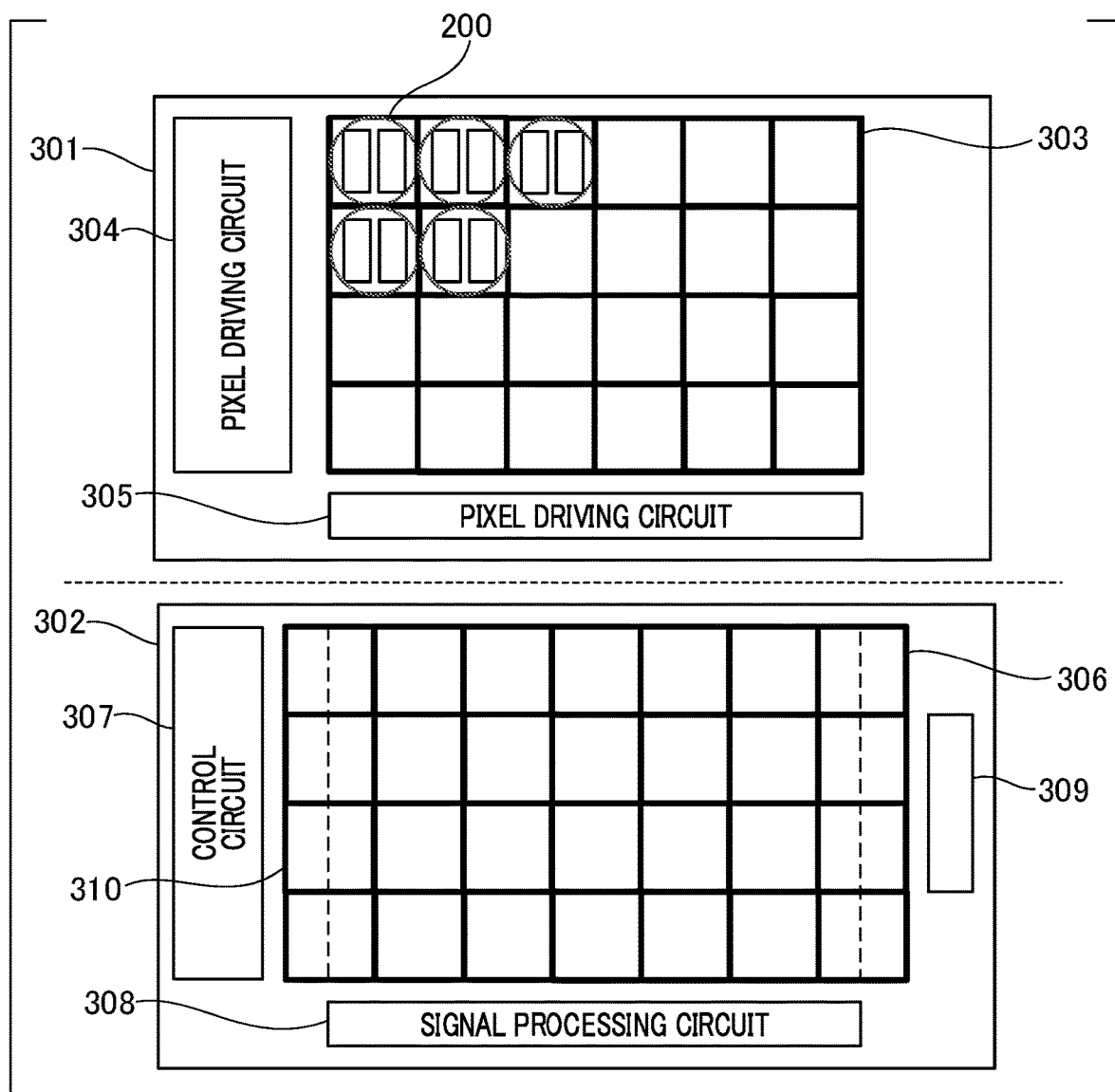
FIG. 3 is a plan view illustrating a configuration example of the image pickup element according to the first embodiment.

FIG. 3 is a block diagram that illustrates a configuration example of the image pickup element 103. The image pickup element 103 incudes a pixel region substrate 301 and a readout circuit substrate 302, and the pixel region substrate 301 is laminate on the readout circuit substrate 302. Wiring of each substrate is electrically connected by using, for example, a silicon through-electrode.

The pixel region substrate 301 includes a pixel region 303 and a plurality of pixel driving circuits 304 and 305. In the pixel region 303, many unit pixels 200 are arranged in a matrix shape to receive light from the object. The pixel driving circuits 304 and 305 drive and scan a unit pixel. The pixel driving circuit 304 mainly performs driving and scanning in the row direction, and the pixel driving circuit 305 mainly performs driving and scanning in the column direction.

In contrast, the readout circuit substrate 302 includes a readout circuit 310 comprising a plurality of readout circuit regions 306, a control circuit 307, a digital signal processing circuit 308, and a digital signal output circuit 309.

The control circuit 307 includes a timing generation circuit (TG) and transmits signals to the pixel driving circuits 304 and 305 of the pixel region substrate 301, the readout circuit 310, the digital signal processing circuit 308, and the digital signal output circuit 309 to control the driving thereof. The pixel driving circuits 304 and 305 transmit drive signals to each unit pixel 200 of the pixel region 303 and control driving, for example, reset, storing, transfer of the charges of the unit pixel 200, and output to the readout circuit 310. Under the control of the control circuit 307, the readout circuit 310 acquires the output signals of the pixel group, and performs analog-to-digital (AD) conversion. The digital signals after AD conversion are sequentially output from the digital signal output circuit 309 to the outside of the image pickup element 103 through the digital signal processing circuit 308.

As shown in FIG. 3, one readout circuit 310 has an area substantially the same as the area of the unit pixel 200, and is provided with readout circuits approximately equal to the number of unit pixels. In FIG. 3, although the unit pixels 200 (6×4=24 pixels) are illustrated in the pixel region 303, the image pickup element 103 is practically provided with a pixel array composed of one million or tens of millions of the unit pixels 200. The readout circuit region 306 is composed of one million to tens of millions of the readout circuits 310.

In the image pickup element 103 having the readout circuits 310 that are almost equal to the number of the unit pixels 200, when the pixel region substrate 301 and the readout circuit substrate 302 are laminated, the unit pixel 200 and the readout circuit 310 having a corresponding positional relation are connected. By connecting both at the shortest distance, the image pickup element 103 can be configured without laying the output line from the pixel portion in a complicated manner.

Here, a description will be given of a case in which the signal of the photoelectric converter 200A and the signal of the photoelectric converter 201B of the unit pixel 201 are respectively read out in driving for focus detection. In this case, if the signal is read out from the PD of the photoelectric converter 201B after the signal has been read out from the PD of the photoelectric converter 201A, a difference occurs in an exposure timing of each PD signal. This may lead to a decrease in the focus detection performance for a specific object (for example, an object that moves at a high speed).

Accordingly, in the present embodiment, the photoelectric converter 201A and the photoelectric converter 201B of the unit pixel 200 are connected to separate readout circuits 310. By this configuration, the exposure timings of the A image signal and the B image signal of the unit pixel 200 can be made equal. However, if the readout circuit 310 is disposed so as to correspond to each of the photoelectric converters 201A and 201B of the unit pixel 200, the circuit area becomes tight. Accordingly, in the present embodiment, each of the photoelectric converters 201A and 201B of the unit pixel shares the readout circuit 310 with a photoelectric converter of a unit pixel adjacent to the unit pixel. By this configuration, it is possible to suppress an increase in the area of the readout circuit, that is, the AD conversion circuit, and to maintain the simultaneity of the storing timings of the PDs in a unit pixel in the signal acquisition for focus detection.

Figure 4:
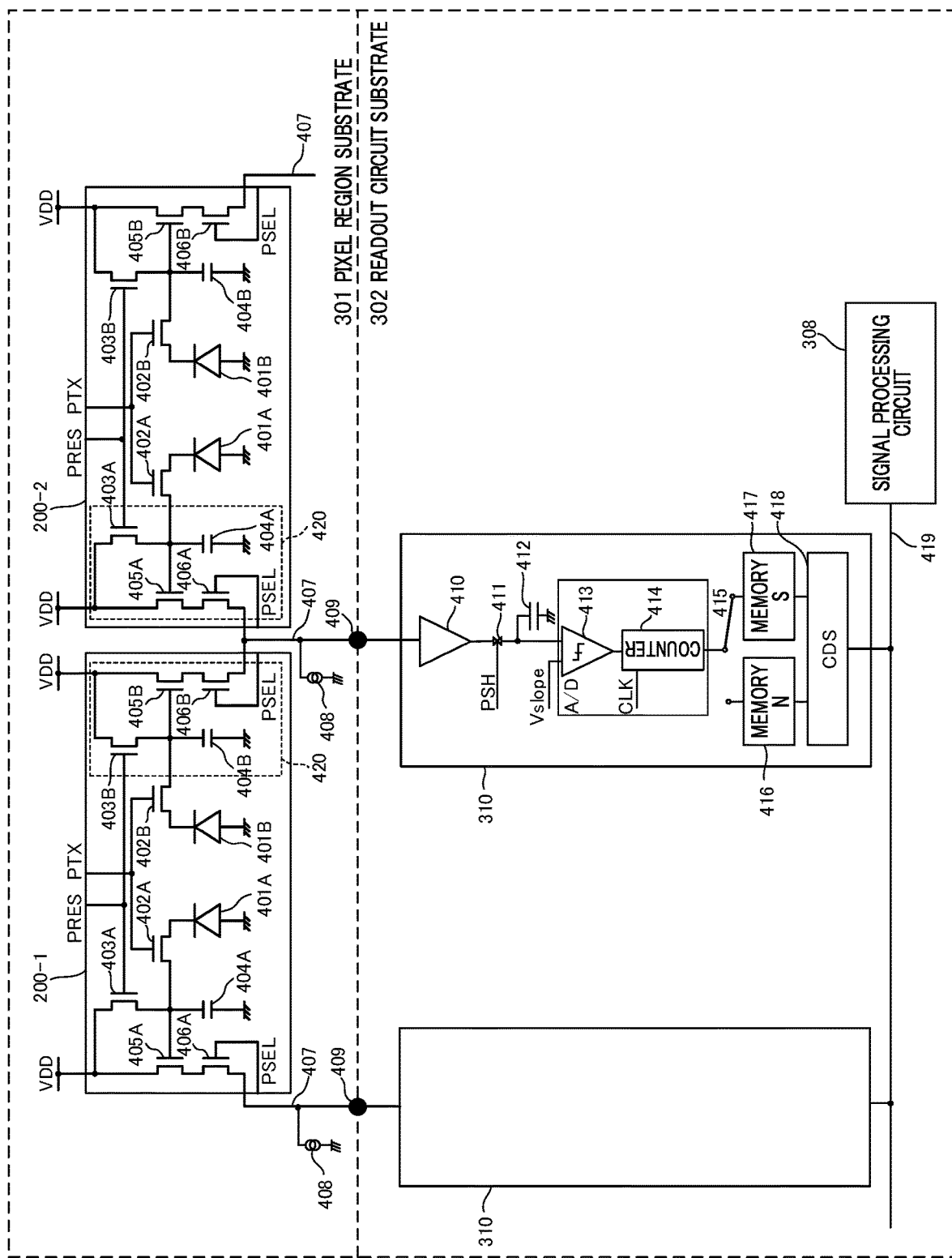
FIG. 4 is a diagram for explaining a configuration of a pixel of the image pickup element and a readout circuit according to the first embodiment.
Figure 5:
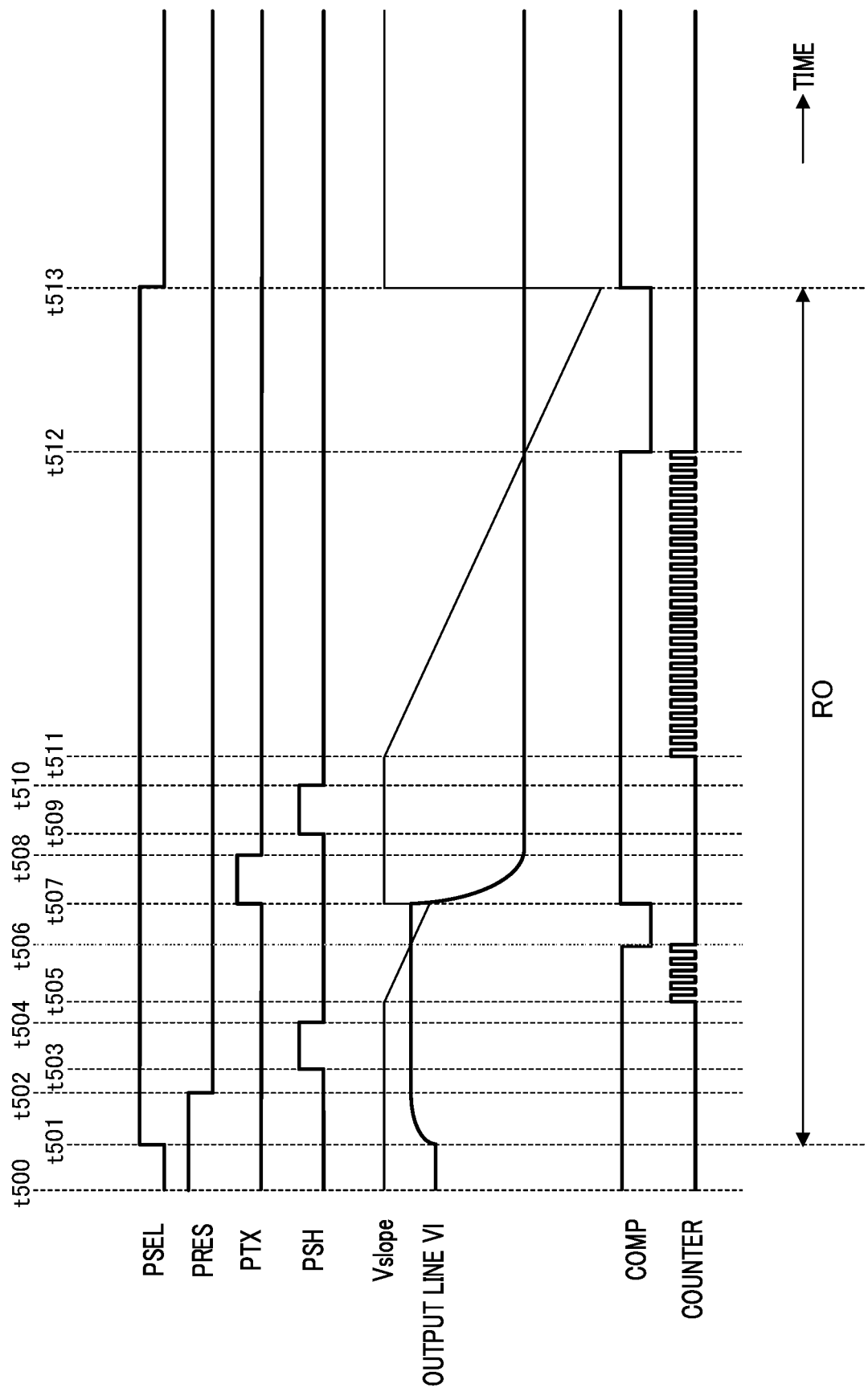
FIG. 5 is a timing chart illustrating an example of a signal readout operation according to the first embodiment.

With reference to FIG. 4 and FIG. 5, the signal readout driving from the unit pixel 200 will be described in detail. FIG. 4 illustrates a configuration of the unit pixel 200 and the readout circuit 310 of the image pickup element 103. In the present embodiment, a configuration will be described in which two photoelectric converters that are adjacent in the row direction share one readout circuit 310.

FIG. 4 illustrates unit pixels 200-1 and 200-2, which are adjacent to each other, two readout circuits 310, and the digital signal processing circuit 308. The unit pixel 200-1 has a first photoelectric converter including a PD 401A and a second photoelectric converter including a PD 401B and the unit pixel 200-2 has a first photoelectric converter including the PD 401A and a second photoelectric converter including the PD 401B. The second photoelectric converter of the unit pixel 200-1 and the first photoelectric converter of the unit pixel 200-2 are adjacent to each other in the row direction, and one readout circuit 310 is shared between them.

Since the unit pixels 200-1 and 200-2 have the same configuration, the components thereof will be described together without adding "−1" or "−2" to their reference numerals. The unit pixel 200-1 (or 200-2) formed on the pixel region substrate 301 is connected to the readout circuit 310 formed on the readout circuit substrate 302 via a silicon through-electrode 409.

The PD 401A and PD 401B configuring the photoelectric converter generate charges on an object image formed by the image pickup lens 101, and store the generated charges. The charges stored in the PD 401A and PD 401B are respectively transferred to floating diffusion portions (FDs) 404A and 404B, which are charge holding portions, via MOS (metal oxide semiconductor) transistors 402A and 402B. Hereinafter, a transfer switch element (MOS transistor) is referred to as a "transfer switch" and a selection switch element (MOS transistor) is referred to as a "selection switch". The floating diffusion portion is referred to as the "FD".

When selection switches 406A and 406B are turned on, the each of the charges that has been transferred to the FDs 404A and 404B are output to an output line 407 as a voltage corresponding to the charge via MOS transistors 405A and 405B. The MOS transistors 405A and 405B are amplification MOS transistors that form a source follower amplifier (hereinafter, referred to as an "SF"). A current source 408 is connected to the output line 407.

The selection switches 406A and 406B are MOS transistors controlled in the pixel portion under the control of the pixel driving circuits 304 and 305. The pixel signals that have been selected by the selection switches 406A and 406B are collectively output to the output line 407.

MOS transistors 403A and 403B function as a reset switch. The reset switches 403A and 403B reset the potentials of the FDs 404A and 404B, and the potentials of the PDs 401A and 401B via the transfer switches 402A and 402B to a predetermined value VDD.

The transfer switch, the reset switch, and the selection switch are each controlled via a signal line connected to pixel driving circuits 304 and 305 (not illustrated). FIG. 4 illustrates control signals PTX, PRES, and PSEL for transfer switches 402A and 402B, the reset switches 403A and 403B, and selection switches 406A and 406B. The signal line from the pixel driving circuit 304 can be controlled in a row unit. The driving of a predetermined unit pixel can be controlled by connecting the signal line that ON/OFF controls each switch from the pixel driving circuit 305 to a corresponding switch and controlling each of the switches.

Next, a circuit configuration of the readout circuit 310 will be described. Since the readout circuits 310 have the same circuit configuration, a description will be given to the configuration of the readout circuit 310 shared by the second photoelectric converter of the unit pixel 200-1 and the first photoelectric converter of the unit pixel 200-2. An amplifier 410 amplifies an input signal from the output line 407. A capacitor 412 is used for holding a signal voltage. A switch 411 that is turned on and off by the control signal PSH controls the writing of the signal to the capacitor 412.

A reference voltage Vslope that has been supplied from a slope voltage generating circuit (not illustrated) is input to one input terminal of a comparator 413, and an output of the capacitor 410 written in the amplifier 412 is input to the other input terminal. The comparator 413 compares the output of the amplifier 410 with the reference voltage Vslope, and outputs either a low level or a high-level binary signal according to the magnitude relation. Specifically, the comparator 413 outputs a low-level signal when the Vslope is smaller than the output of the amplifier 410, while the comparator 413 outputs a high-level signal when the Vslope is larger than the output of the amplifier 410.

A counter 414 is positioned at a subsequent stage of the comparator 413 and performs a counting operation based on the clock signal CLK. The clock signal CLK is input to the counter 414 at the same time that the transition of the reference voltage Vslope starts. The counter 414 performs a count-up corresponding to CLK when the output of the comparator 413 is at a high level and stops counting at the same time that the output of the comparator 413 is inverted to a low level.

The output of the counter 414 is held by a memory 416 or a memory 417 via a switch 415. The memory 416 holds a digital signal obtained by AD converting a reset level signal (hereinafter, referred to as an "N signal") of the FD 404. The memory 417 holds a digital signal obtained by AD converting a signal in which the signal of the PD 401A or the PD 401B is superimposed on the N signal of the FD 404 (hereinafter, referred to as "S signal"). The switch 415 controls whether the signal is to be written in the memory 416 or the memory 417.

A CDS (Correlated Double Sampling) circuit 418 acquires signals held in the memories 416 and 417 and performs correlation double sampling processing. The difference between the S signal and the N signal is calculated for the signals held in the memories 416 and 417. The output signal of the CDS circuit 418 is input to the digital signal processing circuit 308 via a digital signal output line 419 under the control of the control circuit 307.

As shown in FIG. 4, the signal of the PD 401B of the unit pixel 200-1 and the signal of the PD 401A of the unit pixel 200-2 adjacent to the unit pixel 200-1 are read out from a first readout circuit 310. That is, the selection switch 406B of the unit pixel 200-1 and the selection switch 406A of the unit pixel 200-2 are connected to the identical output line 407. The selection switch 406A of the unit pixel 200-1 is connected to a second readout circuit 310 adjacent to the first readout circuit 310 and the readout circuit is shared with the selection switch 406B of an adjacent pixel (not illustrated). As described above, in the two unit-pixels adjacent to each other in the right and left direction, one of the two photoelectric converters of each pixel shares one readout circuit 310. Accordingly, as shown in FIG. 3, when viewed from the optical axis direction, it is preferable that the readout circuit 310 is disposed to be shifted by half a pixel relative to the arrangement of the unit pixel 200. Specifically, on the readout circuit substrate 302, the position of the readout circuit 310 is between the first position corresponding to the photoelectric converter of the unit pixel 200-1 and the second position corresponding to the photoelectric converter of the unit pixel 200-2 (intermediate position).

In the configuration shown in FIG. 3, although it is necessary to add the readout circuit 310 for the photoelectric converter 201A in the left end column and the photoelectric converter 201B in the right end column, the increment is small taking into consideration the number of the tens of millions of readout circuits 310 in total. Additionally, in order to acquire a signal (black reference signal) serving as a reference of a signal level, the image pickup element is typically provided with optical black pixels, which are shielded so as not to react with light. In many cases, the optical black pixels are provided in the upper, lower, right, and left end regions of the pixel region. In this case, the optical black pixels are provided in the left end region and the right end region of the pixel region, and no readout circuit is provided for the photoelectric converter of the unit pixel in the endmost column. By providing the optical black pixels in the right and left end regions, the configuration that is a feature of the present invention can be applied to the photoelectric converter 201A in the leftmost column and the photoelectric converter 201B in the rightmost column of a light reacted pixel (aperture pixel) region, which are used for image pickup. Specifically, in the adjacent first and second unit pixels, a configuration is realized in which the photoelectric converter of the first unit pixel and the photoelectric converter of the second unit pixel share one readout circuit 310.

Hereinafter, a circuit for reading out the charge of the PD to the output line 407 will be referred to as a signal readout unit 420 and it includes the FD 404, the SF 405, the selection switch 406, and the reset switch 403. Although the details will be described below in the modification, the signal readout unit 420 can also be shared between the photoelectric converters provided in each of the unit pixels adjacent to each other in the right and left directions.

FIG. 5 is a timing chart illustrating an example of a signal readout operation of the image pickup element 103 having the circuit configuration shown in FIG. 4 from the unit pixel 200. FIG. 5 schematically illustrates temporal changes in each timing of the control signals PSEL, PRES, PTX, and PSH, the reference voltage Vslope, the output line VI, the output COMP of the comparator 413, and the output of the counter 414. The direction of the time axis is the right direction in FIG. 5, and the t500 to t513 are represented as timings. The output line VI indicates the potential output from the amplifier 410.

The charges stored in the PD 401A and PD 401B of the unit pixel 200 are read out by another readout circuit 310 controlled by the same driving pulse. In the description of a charge readout operation below, the letters "A" and "B" of the PD 401A and PD 401B will be omitted. Regarding the level of the control signals, a high level is denoted by "Hi" and a low level is denoted by "Lo".

Prior to reading out the signal from the PD 401, at timing t500, the control signal PRES of the reset switch 403 becomes Hi. Thus, the gate of the SF 405 is reset to a reset power supply voltage. At timing t501, the control signal PSEL becomes Hi and the SF 405 enters an operating state.

When the control signal PRES becomes Lo at timing t502, the reset of the FD 404 is canceled. The potential of the FD 404 at this time is read out to the output line 407 as a reset signal level (N signal) and input to the readout circuit 310.

At timing t503, the control signal PSH becomes Hi and the switch 411 is turned on. At timing t504, the control signal PSH becomes Lo and the switch 411 is turned off. As a result, the N signal that has been read out to the output line 407 is amplified by the amplifier 410 with a predetermined gain, and held in the capacitor 412. The potential of the N signal held in the capacitor 412 is input to one input terminal of the comparator 413.

After timing t504, during a time period from timing t505 to timing t507, the reference voltage Vslope decreases from the initial value as time passes by a slope voltage generating circuit (not illustrated). With the start of transition of the reference voltage Vslope at timing t505, the clock signal CLK is supplied to the counter 414. The count value of the counter 414 increases in accordance with the number of CLKs. At timing t506, the reference voltage Vslope that has been input to the comparator 413 reaches the level the same as the N signal. At this time, the output COMP of the comparator 413 becomes Lo and the operation of the counter 414 stops. That is, the count value when the operation of the counter 414 stops is a value obtained by AD conversion of the N signal, and is held in the first memory 416. Hereinafter, the first memory is referred to as an "N memory".

At timing t507, which is after the digitized N signal has been held in the N memory 416, the control signal PTX becomes Hi, and at the next timing t508, the control signal PTX becomes Lo. Thus, the photo charges stored in the PD 401 are transferred to the FD 404. The potential variation of the FD 404 corresponding to an amount of charge is read out to the output line 407 to serve as an S signal and input to the readout circuit 310. The S signal is a signal including a light component and a reset noise component (equivalent to an N signal).

The amplifier 410 acquires the S signal and amplifies it with a predetermined gain. Subsequently, at timing t509, the control signal PSH becomes Hi, and at timing t510, the control signal PSH becomes Lo. By sequentially turning on and off the switch 411, the signal potential is held in the capacitor 412. The potential held in the capacitor 412 is input to one input terminal of the comparator 413.

During a time period from timing t511 to timing t513 after the switch 411 has been turned off at timing t510, the reference voltage Vslope decreases with the passage of time from the initial value by the slope voltage generating circuit. With the start of transition of the reference voltage Vslope, the CLK is supplied to the counter 414 and the count value of the counter 414 increases in accordance with the number of CLKs. At timing 512, the reference voltage Vslope reaches a level that is the same as that of the S signal. At this time, the output COMP of the comparator 413 becomes Lo and the operation of the counter 414 stops. That is, the count value when the operation of the counter 414 stops becomes a value obtained by AD conversion of the S signal and is held in the second memory 417. Hereinafter, the second memory serving as the memory for the S signal is referred to as an "S memory".

The CDS circuit 418 calculates a differential signal level (an optical signal) based on the signals held in each of the N memory 416 and the S memory 417. Thereby, the S signal from which the reset noise component has been removed is acquired. Under the control of the control circuit 307, each S signal is sequentially transferred to the digital signal processing circuit 308 via the digital signal output line 419. After calculation processing, for example, clamping is performed in the digital signal processing circuit 308, the signal is output to the outside of the image pickup element 103 via the digital signal output circuit 309.

The S signal of each of the PD 401A and the PD 401B configuring the unit pixel 200 can be read out simultaneously. Specifically, it is possible to coordinate the storing timings between the S(A) signal, which is the S signal from the PD 401A, and the S(B) signal, which is the S signal from the PD 401B. For the S(A) signal and the S(B) signal, for example, the digital signal processing circuit 308 performs addition processing to generate a "S(A)+S(B)" signal, which is an addition signal. Thus, a signal for image pickup can be obtained. This addition processing may be performed by the signal processing circuit 104 provided in the image pickup apparatus 100.

The time RO shown in FIG. 5 corresponds to the length of the time period from timing t501 to timing t513, and is the readout time for the pixel signal of the unit pixel 200. The operation at the time RO is repeated two times, whereby another signal readout from the PD 401 sharing the readout circuit 310 is performed. In this way, eventually, the signals of all pixels of the image pickup element 103 can be read out.

Figures 6A, 6B:
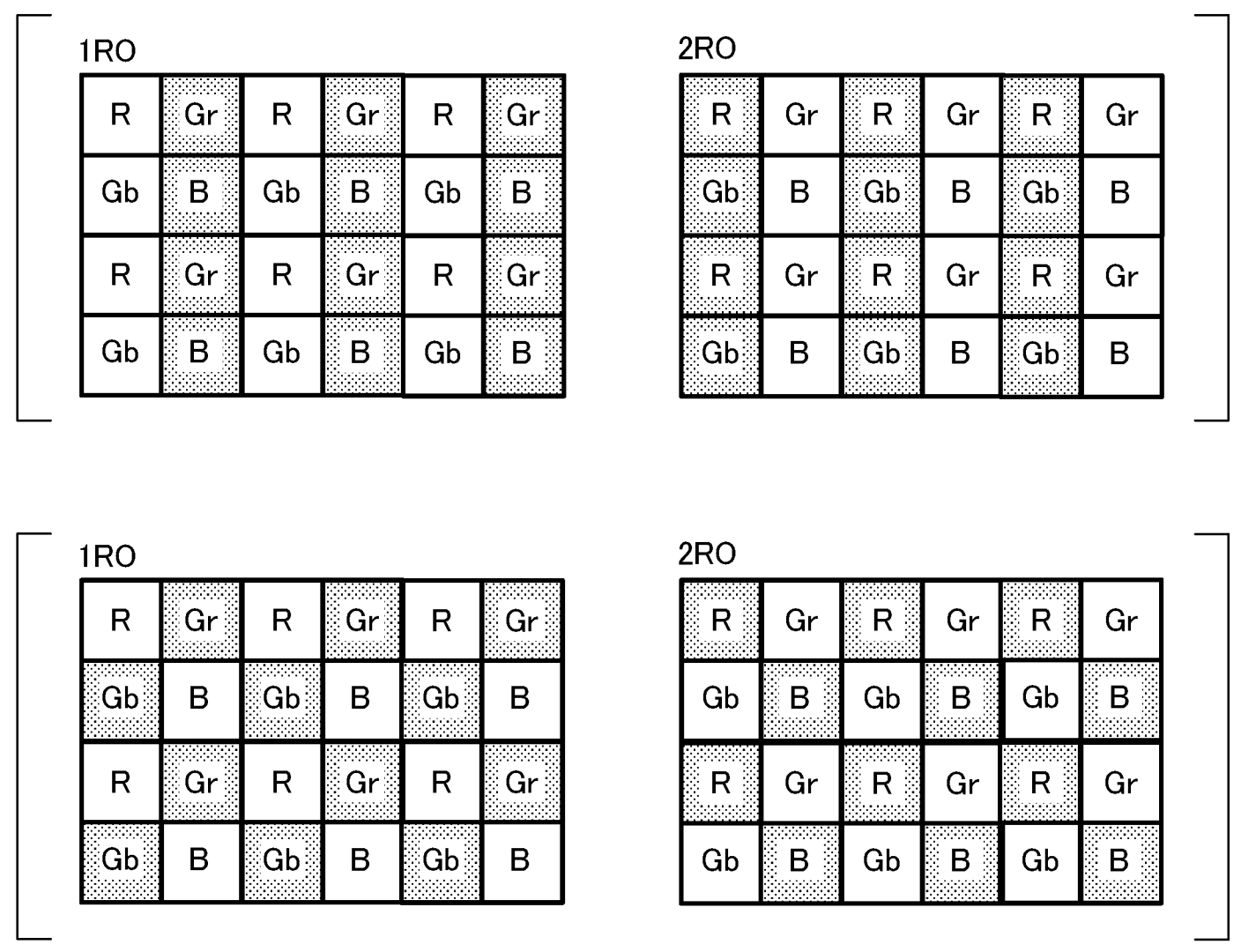

FIGS. 6A and 6B illustrate an example of the readout order of the pixel signals in the present embodiment. Similar to a typical image pickup element, the image pickup element 103 is provided with a color filter that transmits wavelength bands of each R (red), G (green), and B (blue) on each unit pixel. For example, a configuration example in which sets of R, Gr, Gb, and B color filters arranged in the Bayer pattern are two-dimensionally arrayed is illustrated.

FIG. 6A illustrates an example in which signals of a unit pixel belonging to an even-numbered column are read out during a time period of 1RO, which is a first readout time, and signals of a unit pixel belonging to an odd-numbered column are read out during a time period of 2RO, which is a second readout time following the first readout time. If necessary, drive control may be performed to read out signals of the unit pixel belonging to the odd-numbered column during the time period of 1RO and read out signals of the unit pixel belonging to the even-numbered column during the time period of 2RO.

In order to perform focus detection processing at a higher speed, as shown in FIG. 6B, drive control is performed to read out the signal of the G pixel first, and subsequently read out the signals of the R pixel and the B pixel. That is, the signals of the Gr pixel and the Gb pixel are read out in the time period of 1RO, which is the first readout time, and the signals of the remaining R pixel and the B pixel are read out in the time period of 2RO, which is the read time following the time period of 1RO. The readout order of each pixel signal can be controlled by the control circuit 307 that controls the pixel driving circuits 304 and 305.

In the present embodiment, a plurality of photoelectric converters of the unit pixel is configured to share a readout circuit with one photoelectric converter of the adjacent pixel. The storing timings for the PDs pertaining to the unit pixel can be coordinated while suppressing an increase in the area of the readout circuit (Ad conversion circuit). Hence, the focus detection processing can be performed with high accuracy even if the object is a high-speed moving body.

Modification of the First Embodiment

Figure 7:
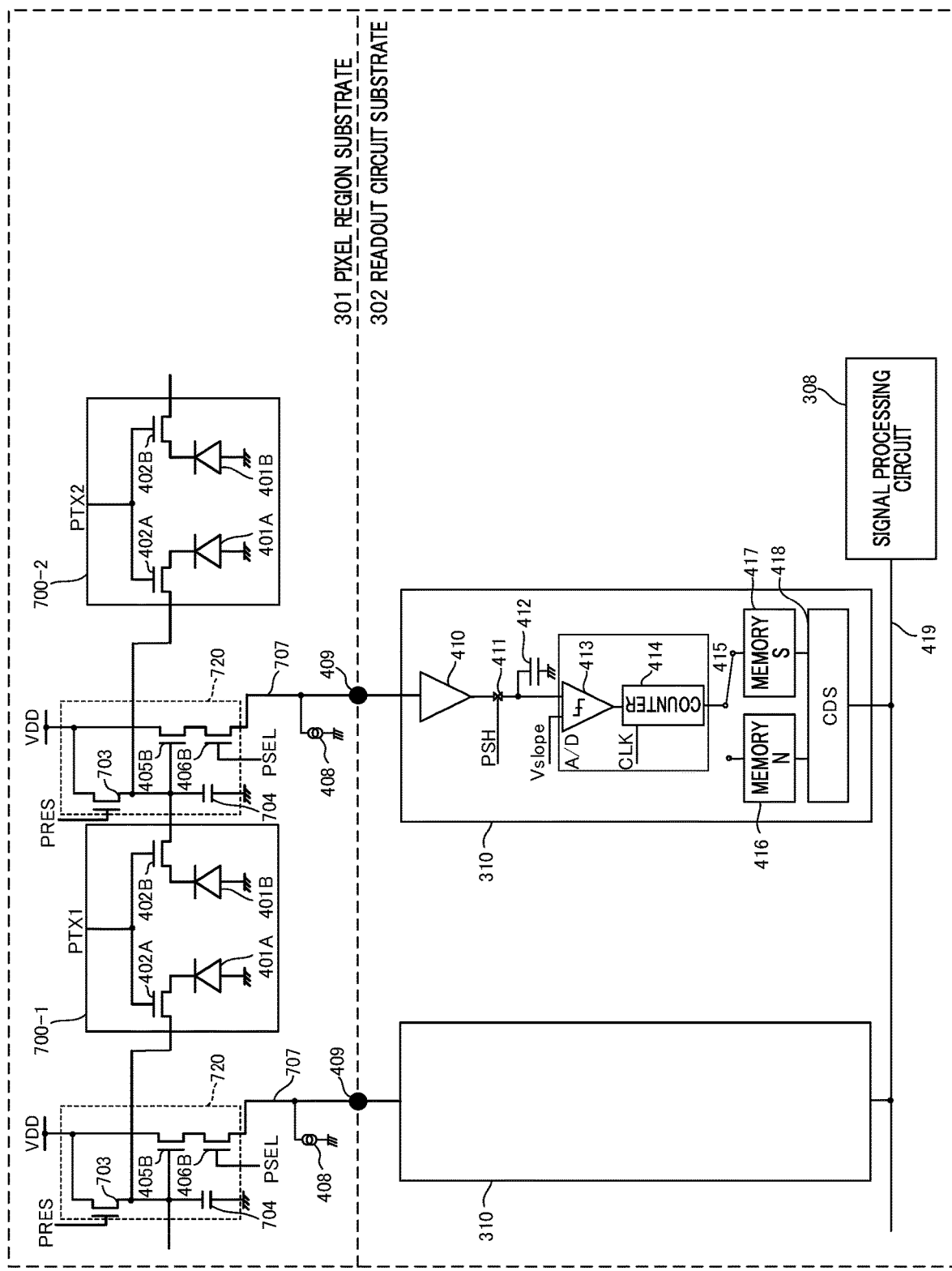
FIG. 7 illustrates a configuration of the pixel of the image pickup element and the readout circuit according to the modification of the first embodiment.

A modification of the first embodiment will be described with reference to FIG. 7. The modification shows an efficient layout of the pixel region substrate 301. FIG. 7 illustrates a configuration of the unit pixel 200 and the readout circuit 310 of the image pickup element 103 according to the present modification. In the present modification, adjacent unit pixels 700-1 and 700-2 that are adjacent to each other share one readout unit 720 and one readout circuit 310.

The readout unit 720 has, for example, an FD 704, a reset switch 703, the selection switch 406B, and an SF 405B. The FD 704 is connected to the PD 401B of the unit pixel 700-1 via the transfer switch 402B and connected to the PD 401A of the unit pixel 700-2 via the transfer switch 402A.

When the selection switch 406B is turned on, the charge transferred from the PD 401B of the unit pixel 700-1 to the FD 704 is output to an output line 707 to serve as a voltage corresponding to the charge through the SF 405B. When the selection switch 406B is turned on, the charge that has been transferred from the PD 401A of the unit pixel 700-2 to the FD 704 is output to the output line 707 to serve as a voltage corresponding to the charge via the SF 405B. The output line 707 is connected to the readout circuit 310 formed on the readout circuit substrate 302 via the silicon through-electrode 409. This readout circuit 310 is shared by the unit pixels 700-1 and 700-2 and its configuration has been described with reference to FIG. 4.

The PDs of the adjacent unit pixels, that is, the PD 401B of the unit pixel 700-1 and the PD 401A of the unit pixel 700-2, share the readout unit 720 including the FD 704. Accordingly, it is possible to realize driving for coordinating the storing timings of the PDs of the unit pixel without providing the FD for each unit pixel. Which charge of PD 401A or PD401B is to be transferred to the FD 704 shared between the unit pixels is determined by the control of the signal PTX (refer to FIG. 7: PTX1 and PTX2).

Second Embodiment

Next, the second embodiment of the present invention will be described. In the present embodiment, a configuration is illustrated in which a readout circuit is shared between photoelectric converters provided in the unit pixels adjacent to each other in the vertical direction (Y axis direction) so that driving suitable for focus detection can be realized. Hereinafter, the differences with the first embodiment will mainly be described, and explanations of the same matter will be omitted by using the reference numerals used in the first embodiment. Such omissions for the same descriptions will also be used in the embodiments to be described below.

Figure 8:
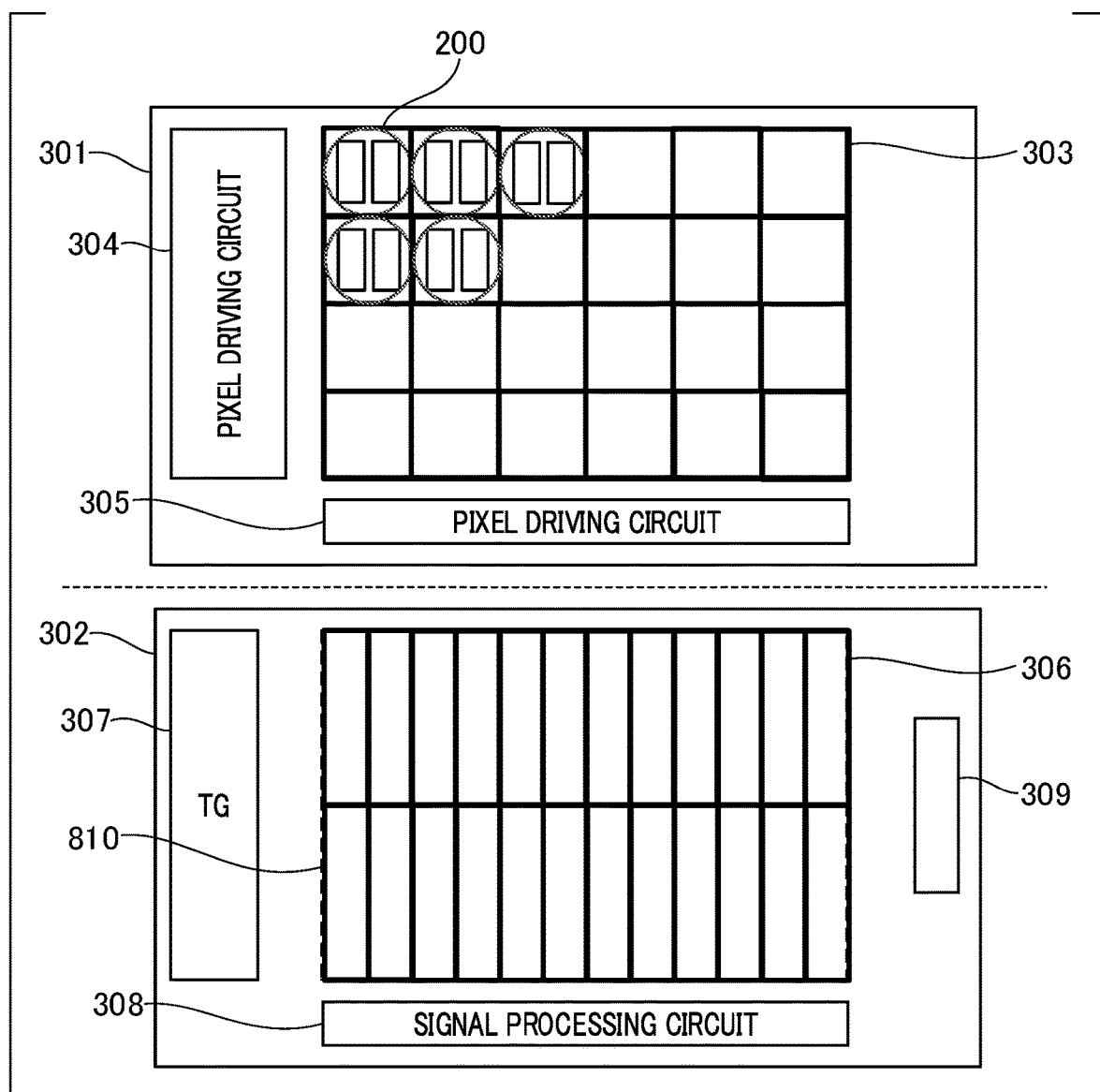
FIG. 8 is a plan view illustrating a configuration example of the image pickup element according to the second embodiment.

FIG. 8 is a plan view illustrating a configuration example of the image pickup element according to the present embodiment. The difference from FIG. 3 shown in the first embodiment is the connection relation between readout circuits 810 disposed on the readout circuit substrates 302 and the photoelectric converters. The photoelectric converter 201A provided in the first unit pixel of the Nth row and the photoelectric converter 201A provided in the second unit pixel of the same row as the first unit pixel in the N+1st row share one readout circuit 810. Similarly, the photoelectric converter 201B provided in the first unit pixel of the Nth row and the photoelectric converter 201B provided in the second unit pixel of the same row as the first unit pixel in the N+1 row share one readout circuit 810.

In FIG. 8, the unit pixels 200 and the readout circuit 810 are illustrated so that the shared relation of the readout circuit between the photoelectric converters can be easily understood. In other words, although one readout circuit 810 is described as being configured by a region having a width of a half pixel in the horizontal direction and a width of two pixels in the vertical direction, the arrangement in the readout circuit is not limited thereto. The signals of the photoelectric converters 201A and 201B configuring the unit pixel 201 are respectively read out from different readout circuits. Accordingly, it is possible to coordinate the storing timings of the signals of the photoelectric converters so as to be similar to the image pickup element of the first embodiment.

Figure 9:
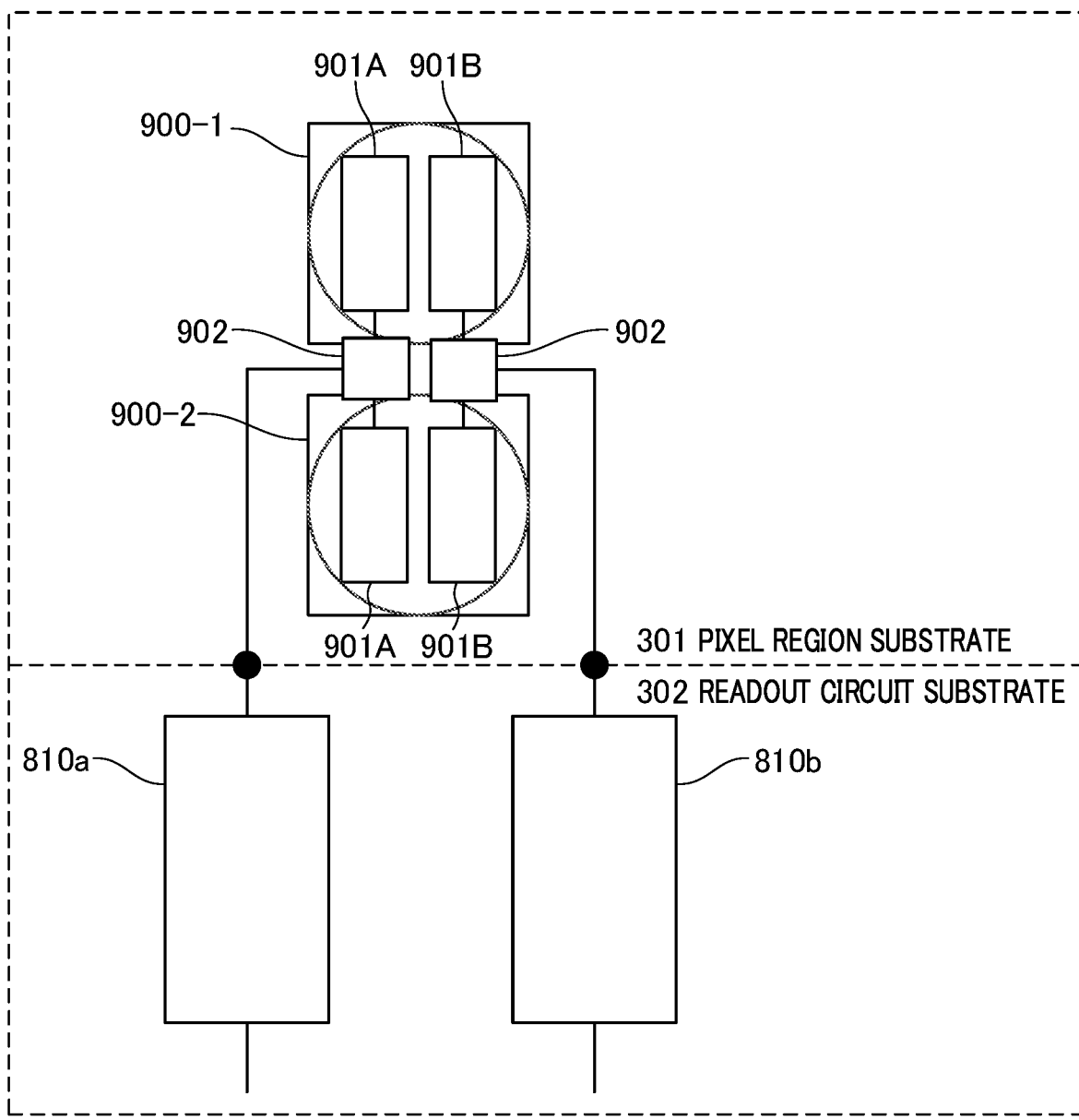
FIG. 9 illustrates a configuration of the pixel of the image pickup element and the readout circuit in the second embodiment.

FIG. 9 schematically illustrates a configuration of the unit pixel and the readout circuit of the image pickup element 103 in the present embodiment. It illustrates unit pixels 900-1 and 900-2 and a plurality of readout units 902 belonging to different rows in the pixel region substrate 301. A plurality of readout circuits 810a and 810b on the readout circuit substrate 302 is also shown.

Each of the unit pixels 900-1 and 900-2 that are vertically adjacent has photoelectric converters 901A and 901B. The photoelectric converter 901A of the unit pixel 900-1 and the photoelectric converter 901A of the unit pixel 900-2 share one readout circuit 810a. Similarly, the photoelectric converter 901B of the unit pixel 900-1 and the photoelectric converter 901B of the unit pixel 900-2 share one readout circuit 810b. FIG. 9 illustrates a configuration in which not only the readout circuit 810 but also the readout unit 902 including the FD are shared as described in the modification of the first embodiment. Specifically, the first or second photoelectric converter of the adjacent unit pixels share one readout unit 902 and one readout circuit 810.

Figures 10A, 10B:
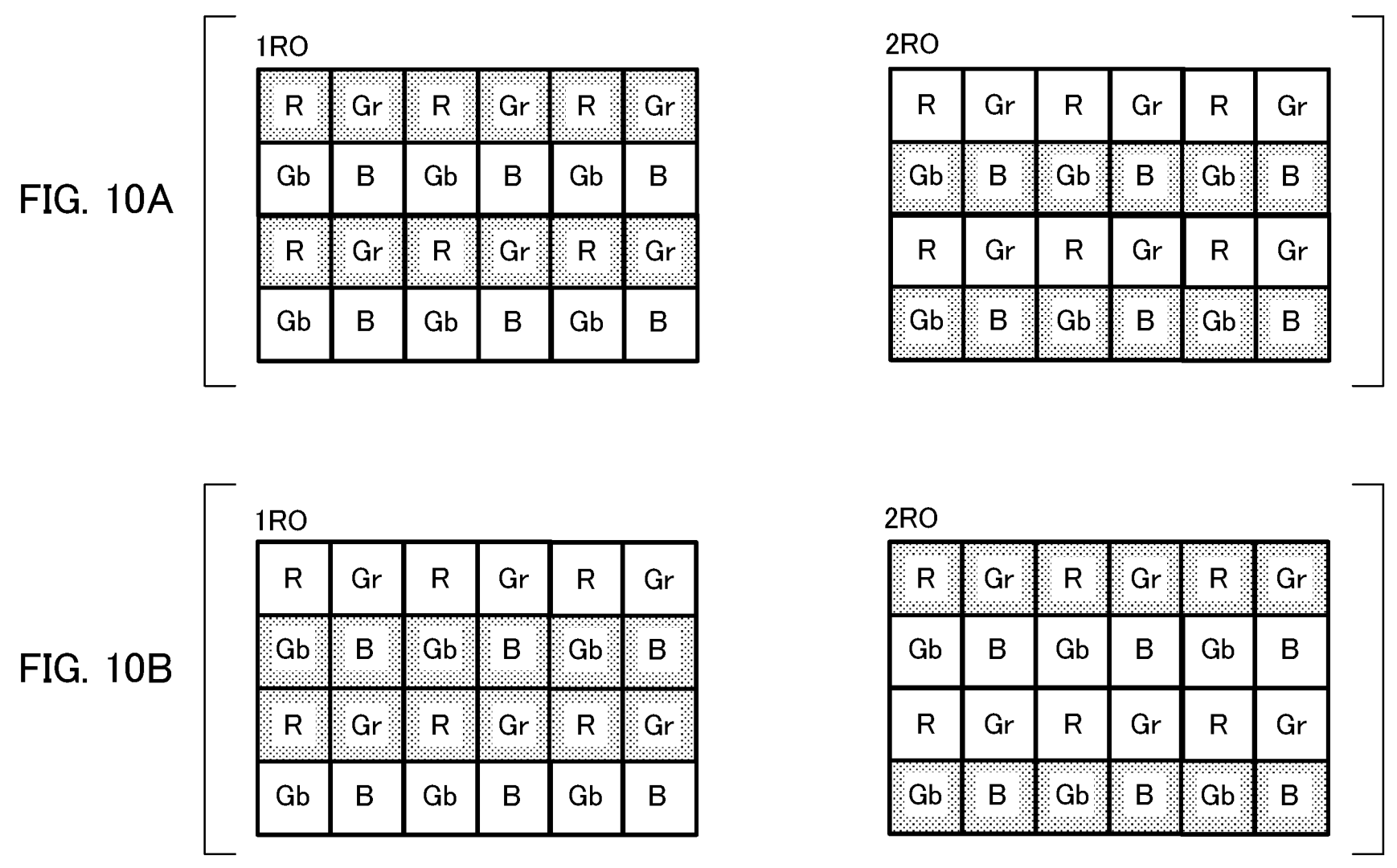

With reference to FIGS. 10A and 10B, a description will be given of the reason why the configuration in which adjacent pixels in the vertical direction share a readout circuit is suitable for focus detection. FIGS. 10A and 10B illustrate an example of the readout order of the pixel signals in the present embodiment.

FIG. 10A illustrates an example in which, under the control of the pixel driving circuits 304 and 305, signals of the unit pixel belonging to odd-numbered rows are read out during the time period of the first readout time 1RO, and signals of the unit pixel belonging to even-numbered rows are read out during the time period of the second readout time 2RO. In the pixel configuration in which the pupil division is performed in the horizontal direction as shown in FIG. 2, a specification in which signals of the same row are acquired when performing correlation calculation is desirable. In the configuration of the present embodiment, since the signals of the same row can be acquired at the same time, focus detection can be performed at a higher speed and with higher accuracy. If necessary, drive control may be performed to read out the signals of the unit pixel belonging to the even-numbered rows during the time period of 1RO, and to read out the signals of the unit pixel belonging to the odd-numbered rows during the time period of 2RO.

FIG. 10B illustrates an example in which, during the time period of the first readout time 1RO, the pixel signals of the second row are read out from the readout circuit 810 at the upper part in FIG. 8 and the pixel signals of the third row are read out from the readout circuit 810 at the lower part in FIG. 8. During the time period of the second readout time 2RO, the pixel signals of the first row are read out from the readout circuit 810 at the upper part in FIG. 8 and the pixel signals of the fourth row are read out from the readout circuit 810 at the lower part in FIG. 8. In the time period of the first readout time 1RO, the signals of the adjacent pixel portions arranged in the Bayer pattern can be acquired simultaneously and the focus detection can be performed with high accuracy regardless of the color of the object.

The configuration in which the pupil division for the unit pixel is performed in in the vertical direction is preferably configured so that the readout circuit is shared by the right and left adjacent pixels as shown in FIG. 3. In this case, a configuration is possible that allows different readout circuits corresponding to the photoelectric converters in the unit pixel to readout signals, and the readout circuit and the readout unit are shared by each of the photoelectric converters of the adjacent pixels.

According to the present embodiment, a plurality of signals suitable for focus detection can be acquired by a readout circuit being shared between each of the photoelectric converters of the unit pixels that are adjacent to each other.

Third Embodiment

Figure 11:
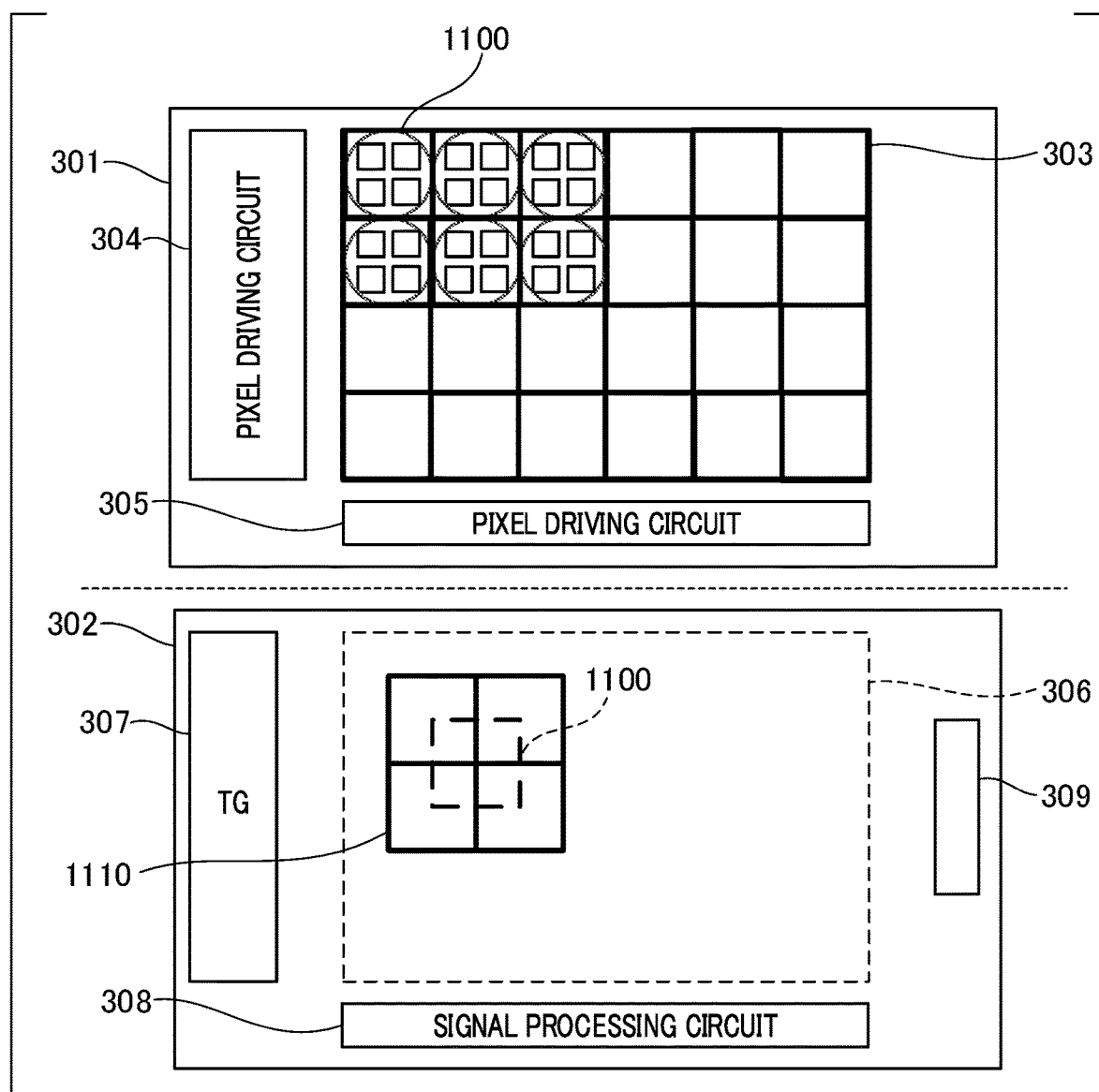
FIG. 11 is a plan view illustrating a configuration example of the image pickup element according to the third embodiment.
Figure 12:
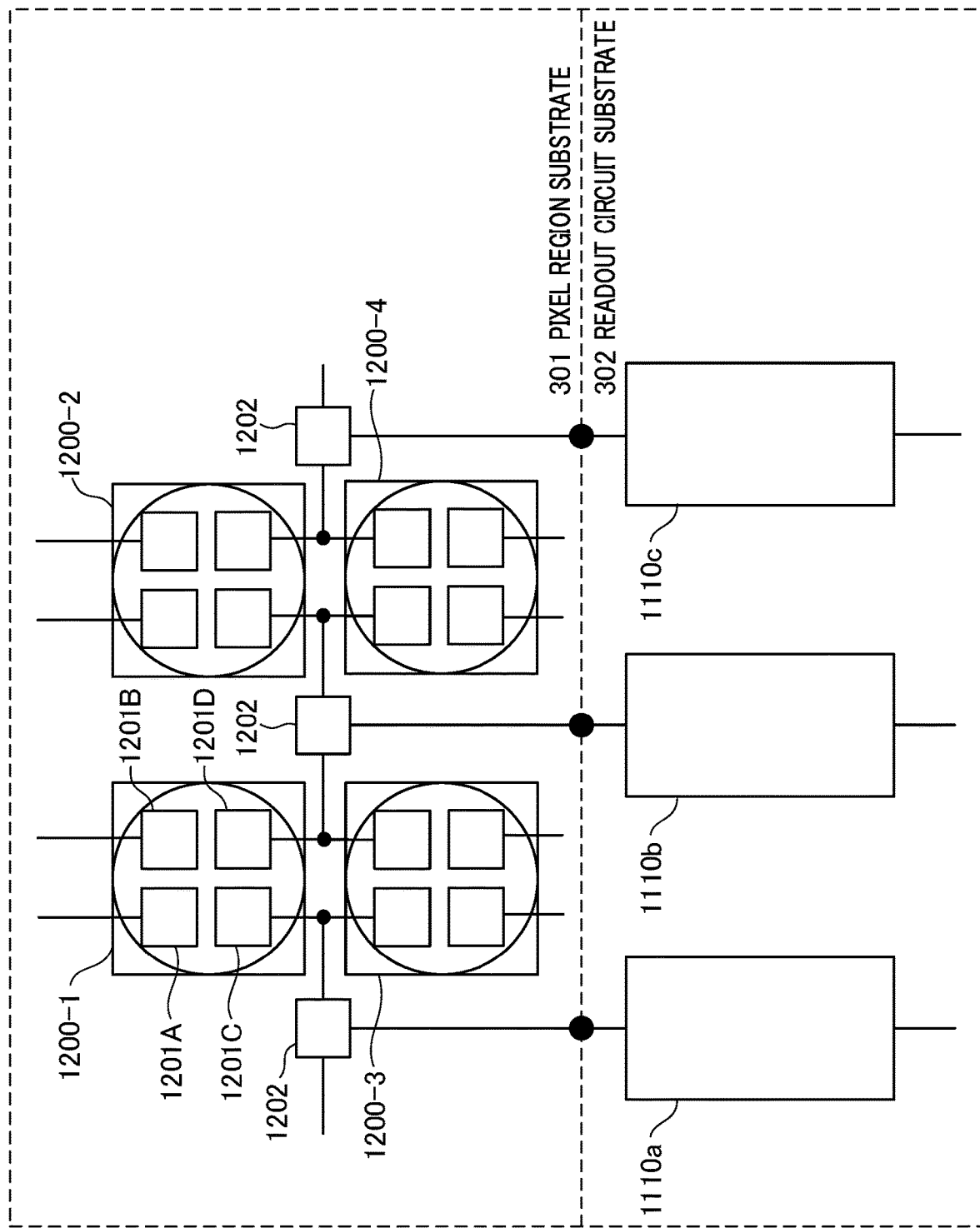
FIG. 12 illustrates a configuration of the pixel of the image pickup element and the readout circuit according to the third embodiment.

With reference to FIG. 11 and FIG. 12, the third embodiment of the present invention will be described. In the present embodiment, an example in which a unit pixel has four photoelectric converters is shown. In other words, a description will be given of an example applied to an image pickup element having a configuration in which pupil division is performed in the vertical direction and the horizontal direction.

FIG. 11 is a plan view illustrating a configuration example of the image pickup element according to the present embodiment. A unit pixel 1100 has four photoelectric converters, that is, two converters in the horizontal direction and two converters in the vertical direction. Each photoelectric converter shares a single readout circuit 1100 with the photoelectric converters of the unit pixels that are adjacent to each other. FIG. 11 illustrates only four readout circuits among the readout circuits 1110. Specifically, the correspondence between the four readout circuits 1110 and one unit pixel 1100 (refer to a dotted line frame) is shown.

One readout circuit 1110 is configured to read out each charge from one of the four photoelectric converters of the four unit pixels 1100 located at different positions, so that the signals of all pixels can be read out in a readout time 4RO. Additionally, an increase in the area of the readout circuit (Ad conversion circuit) can be suppressed relative to the number of unit pixels.

FIG. 12 schematically illustrates a configuration of the unit pixel and the read circuit of the image pickup element 103 in the present embodiment. A unit pixel 1200-1 has four photoelectric converters 1201A, 1201B, 1201C, and 1201D. In the unit pixel 1200-1, the photoelectric converter 1201A is located in the upper left, the photoelectric converter 1201B is located in the upper right, the photoelectric converter 1201C is located in the lower left, and the photoelectric converter 1201D is located in the lower right. Additionally, unit pixels 1200-2, 1200-3, and 1200-4 each have four photoelectric converters 1201A, 1201B, 1201C, and 1201D in the positional relation that is the same as the unit pixel 1200-1.

In the pixel region substrate 301 shown in FIG. 12, the unit pixel 1200-2 is located to the right of the unit pixel 1200-1, and the unit pixel 1200-3 is located below the unit pixel 1200-1. The unit pixel 1200-4 is located to the right of the unit pixel 1200-3. On the readout circuit substrate 302, three readout circuits 1110a, 1110b, and 1110c are shown.

The photoelectric converter 1201D of the unit pixel 1201-1, the photoelectric converter 1201C of the unit pixel 1200-2, the photoelectric converter 1201B of the unit pixel 1200-3, and the photoelectric converter 1201A of the unit pixel 1200-4 share one readout circuit 1110b. Similarly, another photoelectric converter shares the readout circuit with the photoelectric converters of the different pixels that are adjacent to each other. For example, the photoelectric converter 1201C of the unit pixel 1200-1, the photoelectric converter 1201A of the unit pixel 1200-3, the photoelectric converter 1201D of a unit pixel (not illustrated), and the photoelectric converter 1201B of a unit pixel (not illustrated) share one readout circuit 1110a. The unit pixels (not illustrated) are unit pixels each located to the left of the unit pixels 1200-1 and 1200-3.

In the present embodiment, it is possible to perform driving to coordinate the storing timings for the photoelectric converters of each unit pixel. Additionally, as described in the modification of the first embodiment, not only the readout circuit but also the readout unit including the FD can be shared between the photoelectric converters. In FIG. 12, the photoelectric converters 1201D, 1201C. 1201B, and 1201A of the unit pixels 1200-1 to 1200-4 share one readout unit 1202 and the readout circuit 1110b.

According to the embodiments, it is possible to provide an image pickup element and an image pickup apparatus that can maintain the simultaneity of the storage timings of the photoelectric converters in the unit pixel in signal acquisition for focus detection while suppressing an increase in the area of an AD converter in a readout circuit substrate.

In the above embodiment, although an example of an image pickup element having a configuration in which the first and second substrates are laminated has been described, the present invention is not limited thereto, and can be applied to an image pickup element having various configurations using, for example, a multilayer substrate and a double-sided substrate.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-069090, filed Apr. 7, 2020, which is hereby incorporated by reference wherein in its entirety.

What is claimed is:

1. An image pickup element comprising:
 a plurality of pixel portions each configured to have a plurality of photoelectric converters, and
 a plurality of readout circuits configured to read out a signal based on charges accumulated in the plurality of photoelectric converters,
 wherein each of the plurality of readout circuits has a circuit configured to convert the signal into a digital signal,
 wherein a first photoelectric converter of a first pixel portion of the plurality of pixel portions and a second photoelectric converter of a second pixel portion of the plurality of pixel portions adjacent to the first pixel portion share a first readout circuit,
 wherein the first readout circuit reads out a signal based on a charge accumulated in the first photoelectric converter and a signal based on a charge accumulated in the second photoelectric converter,
 wherein the first and second photoelectric converters are adjacent to each other, and
 wherein the first readout circuit is disposed between a first position corresponding to the first photoelectric converter and a second position corresponding to the second photoelectric converter.

2. The image pickup element according to claim 1, further comprising a first substrate and a second substrate,
wherein the first substrate and the second substrate are stacked,
wherein the plurality of pixel portions are arranged on the first substrate,
wherein the plurality of readout circuits are arranged on the second substrate.

3. The image pickup element according to claim 1,
wherein each of the plurality of pixel portion includes a plurality of charge holding portions each configured to hold charges stored in each of the plurality of photoelectric converters, and
wherein the first and second photoelectric converters share a circuit including one charge holding portion.

4. The image pickup element according to claim 3,
wherein the circuit including the charge holding portion has the charge holding portion and a switch element, and is connected to the first readout circuit.

5. An image pickup apparatus provided with an image pickup element comprising:
a plurality of pixel portions each configured to have a plurality of photoelectric converters; and
a plurality of readout circuits configured to read out a signal based on charges accumulated in the plurality of photoelectric converters,
wherein each of the plurality of readout circuits has a circuit configured to convert the signal into a digital signal,
wherein a first photoelectric converter of a first pixel portion of the plurality of pixel portions and a second photoelectric converter of a second pixel portion of the plurality of pixel portions adjacent to the first pixel portion share a first readout circuit,
wherein the first readout circuit reads out a signal based on a charge accumulated in the first photoelectric converter and a signal based on a charge accumulated in the second photoelectric converter,
wherein the first and second photoelectric converters are adjacent to each other, and
wherein the first readout circuit is disposed between a first position corresponding to the first photoelectric converter and a second position corresponding to the second photoelectric converter.

6. The image pickup apparatus according to claim 5,
further comprising at least one processor and memory holding a program that makes the processor function as a controller configured to control the driving of the image pickup element.

7. The image pickup apparatus according to claim 6,
wherein the controller performs control to read out a signal of a pixel portion belonging to an even-numbered column or an odd-numbered column during a first time period, and subsequently read out a signal of a pixel portion belonging to an odd-numbered column or an even-numbered column during a second time period.

8. The image pickup apparatus according to claim 6,
wherein the first pixel portion and second and third pixel portions of the pixel portions are adjacent to each other, and a fourth pixel portion and the second and third pixel portions of the pixel portions are adjacent to each other, and
wherein the controller performs control to read out the signals of the second and third pixel portions during a first time period, and subsequently read out the signals of the first and fourth pixel portions during a second time period.

9. The image pickup apparatus according to claim 6,
wherein the controller performs control to read out a signal of a pixel portion belonging to an odd-numbered row or an even-numbered row during a first time period, and subsequently read out a signal of a pixel portion belonging to an even-numbered row or an odd-numbered row during a second time period.

10. A control method executed in an image pickup element having a plurality of pixel portions each having a plurality of photoelectric converters and a plurality of readout circuits that reads out a signal based on charges accumulated in the plurality of photoelectric converters, wherein each of the plurality of readout circuits has a circuit configured to convert the signal into a digital signal, wherein a first photoelectric converter of a first pixel portion of the plurality of pixel portions and a second photoelectric converter of a second pixel portion of the plurality of pixel portions adjacent to the first pixel portion share a first readout circuit, wherein the first and second photoelectric converters are adjacent to each other, and wherein the first readout circuit is disposed between a first position corresponding to the first photoelectric converter and a second position corresponding to the second photoelectric converter, the control method comprising:
accumulating charges in each of the first and second photoelectric converters; and
reading out a signal based on a charge accumulated in the first photoelectric converter and a signal based on a charge accumulated in the second photoelectric converter by the first readout circuit.

* * * * *